(12) United States Patent
Fukunaga

(10) Patent No.: US 12,314,780 B2
(45) Date of Patent: May 27, 2025

(54) IMAGE CAPTURING APPARATUS, DEVICE, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Kentaro Fukunaga, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 376 days.

(21) Appl. No.: 18/160,589

(22) Filed: Jan. 27, 2023

(65) Prior Publication Data
US 2023/0244551 A1 Aug. 3, 2023

(30) Foreign Application Priority Data
Jan. 31, 2022 (JP) .................................. 2022-013587

(51) Int. Cl.
G06F 9/54 (2006.01)
G06F 1/10 (2006.01)

(52) U.S. Cl.
CPC . *G06F 9/54* (2013.01); *G06F 1/10* (2013.01)

(58) Field of Classification Search
None
See application file for complete search history.

(56) References Cited

U.S. PATENT DOCUMENTS 6,201,413 B1 * 3/2001 Faue .......................... G06F 1/10
326/98
2011/0110656 A1 5/2011 Hamada
(Continued)

FOREIGN PATENT DOCUMENTS

EP 3796641 A1 3/2021
JP 2000253108 A 9/2000
(Continued)

OTHER PUBLICATIONS

The above patent documents were cited in a European Search Report issued on Jun. 19, 2023, that issued in the corresponding European Patent Application No. 23153651.7.
(Continued)

*Primary Examiner* — Angela Nguyen
(74) *Attorney, Agent, or Firm* — Cowan, Liebowitz & Latman, P.C.

(57) ABSTRACT

An image capturing apparatus including a mounting part for enabling attachment and detachment of a device, comprising one or more processors and one or more memories storing executable instructions which, when executed by the processors, cause the image capturing apparatus to perform operations including, generating a first command for supplying clock signals for the device to execute analysis processing, transmitting, in a state where a device having a function of executing the analysis processing is attached to the mounting part, an image to the device, transmitting an execution instruction for executing the analysis processing on the image, and receiving a processing result obtained according to the execution instruction, wherein the first command is transmitted, after transmitting the execution instruction and at least in a period until the analysis processing performed on the image is ended in the device.

20 Claims, 7 Drawing Sheets

(56) References Cited

U.S. PATENT DOCUMENTS

| | | | |
|---|---|---|---|
| 2018/0373828 A1* | 12/2018 | Barak | G06F 1/324 |
| 2019/0094904 A1* | 3/2019 | Yonemoto | G06F 1/04 |
| 2019/0349505 A1 | 11/2019 | Tsuchiya | |
| 2020/0026153 A1 | 1/2020 | Kawai | |
| 2021/0274079 A1 | 9/2021 | Ise | |

FOREIGN PATENT DOCUMENTS

| | | |
|---|---|---|
| JP | 2006-287736 A | 10/2006 |
| JP | 2008287578 A | 11/2008 |

OTHER PUBLICATIONS

The above foreign patent documents were cited in the Nov. 17, 2023 Japanese Office Action, without an English Translation, that issued in Japanese Patent Application No.
J. Redmon et al. "YOLO9000: Better Faster Stronger", Computer Vision and Pattern Recognition (CVPR) 2016 (9pgs), Cited in Specification in paragraphs [0034].
The above U.S. Patent Application Publications #1-2 and Foreign Patent Document #1 were cited in the Jun. 19, 2023 European Patent Office Search Report, that issued in European Patent Application No. 23153649.1.

* cited by examiner

IMAGE CAPTURING APPARATUS, DEVICE, CONTROL METHOD THEREOF, AND NON-TRANSITORY COMPUTER-READABLE STORAGE MEDIUM

BACKGROUND OF THE INVENTION

Field of the Invention

This disclosure relates to an image capturing apparatus, a device, a control method thereof, and a non-transitory computer-readable storage medium.

Description of the Related Art

In recent years, in various scenes, an image analysis is performed for detecting, tracking, estimating attribute, or the like of an object using an image captured by a monitoring camera, and image processing is performed such as estimating the number of objects based on a result of such an image analysis. Heretofore, such image processing has been performed by a high-performance computation apparatuses such as a PC or a server that executes actual image processing for a video which is taken by a monitoring camera and is transferred to the high-performance computation apparatuses. In contrast, as a result of improvement in processing ability of mobile computation apparatuses in recent years, image processing can be performed in a monitoring camera. The processing in the monitoring camera (image capturing apparatus) may be executed by a computation apparatus arranged in a monitoring camera body, for example. Also, by attaching a detachable device such as a USB in which a computation apparatus is arranged to a monitoring camera, the detachable device can execute at least a portion of processing performed in the monitoring camera.

Some detachable devices perform image processing operations using power and a clock signal that are supplied by an apparatus to which the detachable device is attached. However, among apparatuses, such as a PC and a camera, to which the detachable device is attached, there are apparatuses that operate with power supplied by a battery, and such battery-driven apparatuses are equipped with a function of stopping power supply and clock signal supply to the device in a period in which communication with the detachable device is not performed in order to save power, in general. However, if the clock signal supply is stopped, image processing cannot be properly executed in the detachable device. Regarding this issue, in Japanese Patent Laid-Open No. 2006-287736, a technique is disclosed in which, when clock signal supply is stopped, the operation is switched to an operation with a clock signal for self-running.

With the technique disclosed in Japanese Patent Laid-Open No. 2006-287736, addition of a circuit for detecting that a clock signal is stopped and a configuration for switching to an operation using a clock signal for self-running are needed in the detachable device, and therefore the circuit scale increases.

SUMMARY OF THE INVENTION

Therefore, provided is an image capturing apparatus, to which a detachable device can be attached, that enables returning to a state in which image processing can be continued in the detachable device, even when clock signal supply is stopped, without incurring an increase in the circuit scale of the detachable device.

One aspect of embodiments relates to an image capturing apparatus including a mounting part for enabling attachment and detachment of a device, comprising, one or more processors, and one or more memories storing executable instructions which, when executed by the one or more processors, cause the image capturing apparatus to perform operations including generating a first command for supplying clock signals for the device to execute analysis processing, transmitting, in a state where a device having a function of executing the analysis processing is attached to the mounting part, an image to the device, transmitting an execution instruction for executing the analysis processing on the image, and receiving a processing result obtained according to the execution instruction, wherein the first command is transmitted, after transmitting the execution instruction and at least in a period until the analysis processing performed on the image is ended in the device.

Further features of the present invention will become apparent from the following description of exemplary embodiments (with reference to the attached drawings).

DESCRIPTION OF THE EMBODIMENTS

Figure 1:
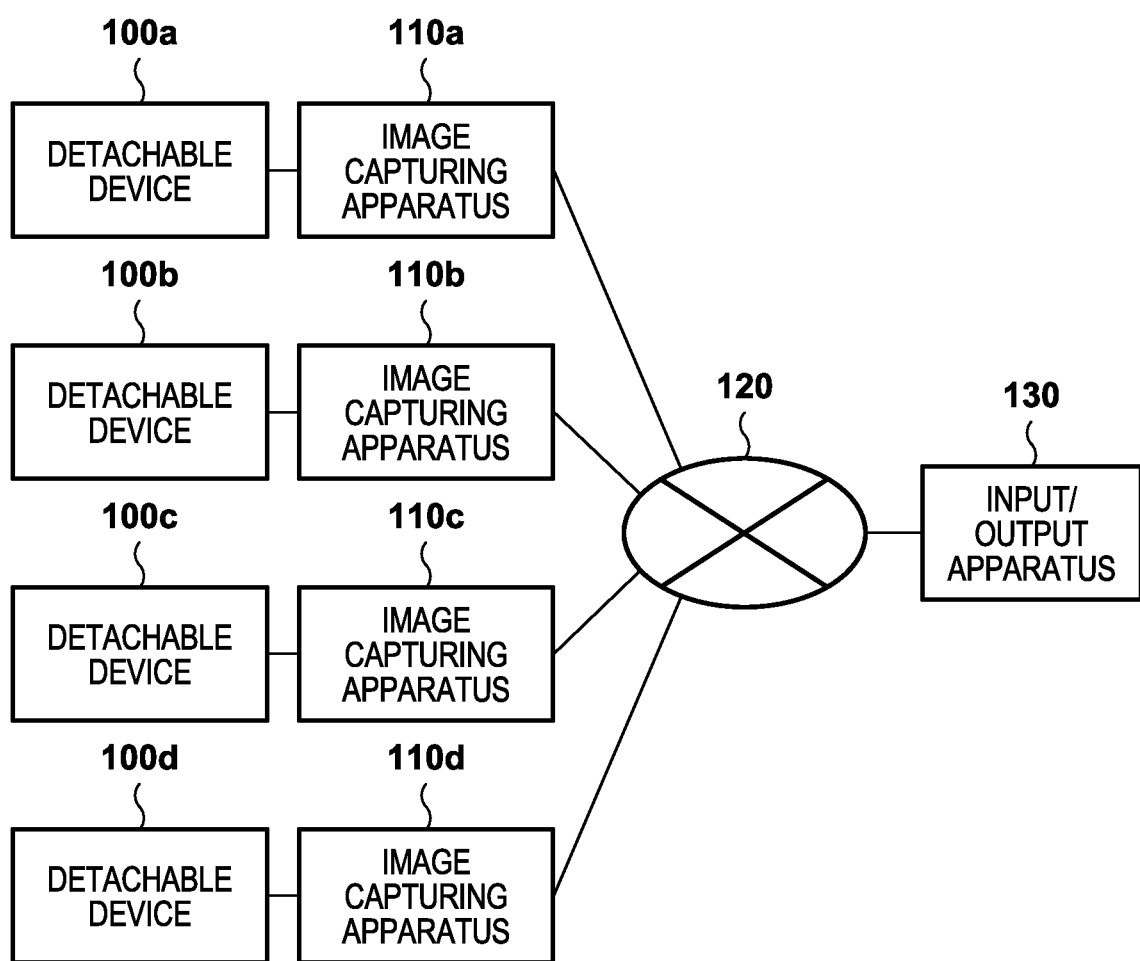
FIG. 1 is a diagram illustrating an example of a system configuration corresponding to embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

System Configuration

FIG. 1 shows an exemplary configuration of an image processing system of the present embodiment. The image processing system may be constructed as a system for tracking a specific person by analyzing captured images input from a plurality of image capturing apparatuses 110, for example. Note that the embodiment is not limited to this embodiment, and the image processing system may be constructed as any system that outputs predetermined information by analyzing an image. The image processing system includes image capturing apparatuses 110a to 110d, a network 120, and an input/output apparatus 130. The image capturing apparatuses 110a to 110d each include a slot to and from which a device that can record a captured image can be attached and detached, for example. The detachable devices 100a to 100d are inserted into the respective slots, and the image capturing apparatuses 110a to 110d are connected to the respective detachable devices 100a to 100d. Hereinafter, the detachable devices 100a to 100d may be collectively referred to as a "detachable device 100", and the image capturing apparatuses 110a to 110d may be collectively referred to as an "image capturing apparatus 110". The apparatuses that constitute the system will be described below.

The detachable device 100 is a computation device that is configured to be attached to and detached from the image capturing apparatus 110. The detachable device 100 can be configured as a device that is realized by mounting a predetermined processing circuit on a nonvolatile semiconductor memory device (e.g., SD card) that is configured to store an image captured by the image capturing apparatus 110, for example. SD card slots are prepared in many existing image capturing apparatuses 110 such as network cameras, and therefore an expanded function can be provided to an existing image capturing apparatus 110 by connecting the detachable device 100 thereto. For example, the detachable device 100 is configured to be entirely insertable into the image capturing apparatus 110, depending on the form of the SD card, and with this configuration, can be configured to be connectable to the image capturing apparatus 110 in a state in which no portion protrudes from the image capturing apparatus 110.

Also, rather than configuring the detachable device 100 as an SD card, the detachable device 100 may also be configured to be attached to the image capturing apparatus 110 with any interface that is used when a storage apparatus that can store at least an image captured by the image capturing apparatus 110 is attached. For example, the detachable device 100 may also include a USB (Universal Serial Bus) interface, and be configured to be attached to a USB socket of the image capturing apparatus 110. Moreover, the predetermined processing circuit to be mounted on the detachable device 100 can be implemented by a field programmable gate array (FPGA) that is programmed to execute predetermined processing, for example, but may also be implemented in another form.

The image capturing apparatus 110 is an image capturing apparatus such as a network camera, and can provide a captured image to the input/output apparatus 130 via the network 120. In the present embodiment, the image capturing apparatus 110 is assumed to incorporate a computation apparatus that can process a captured image, but there is no limitation to this configuration. For example, an external computer such as a personal computer (PC) that is connected to the image capturing apparatus 110 may also be present, and the combination of these apparatuses may also be treated as the image capturing apparatus 110. Also, in the present embodiment, it is assumed that the detachable devices 100 are attached to all of the image capturing apparatuses 110, respectively. In FIG. 1, four image capturing apparatuses 110 and detachable devices that are respectively attached thereto are illustrated, but the number of combinations of these apparatuses may be three or less, or may be five or more.

As a result of attaching the detachable device 100, to the image capturing apparatus 110, that has an image analysis processing function such as image analysis, image analysis or the like can be executed in the image capturing apparatus 110, even though the image capturing apparatus 110 does not have an image analysis processing function such as image analysis. A specific example of the analysis processing will be described later. Also, in a mode in which a computation apparatus for image processing is arranged in the image capturing apparatus 110, as in the present embodiment, as a result of attaching a detachable device 100 in which a computation apparatus is arranged to the image capturing apparatus 110, it becomes possible to use the computation apparatus of the detachable device 100 along with the own computation apparatus of the image capturing apparatus 110, and as a result, the variety and level of image processing that can be executed in the image capturing apparatus 110 can be increased.

The input/output apparatus 130 is an apparatus for receiving inputs from a user of the system and outputting information to the user (e.g., display of information). In the present embodiment, the input/output apparatus 130 can be a computer such as a PC, for example, and as a result of a browser or a native application installed in the computer being executed by the incorporated processor, input/output of information is performed. The image capturing apparatus 110 and the input/output apparatus 130 are communicably connected via the network 120. The network 120 includes a plurality of routers that satisfies a communication standard such as the Ethernet (registered trademark), switches, cables, and the like, for example. In the present embodiment, the network 120 may be any network that enables communication between the image capturing apparatus 110 and the input/output apparatus 130, and may be constructed with any scale, configuration, and communication standard to which the network is conformable. For example, the network 120 may be the Internet, a wired local area network (LAN), a wireless LAN, a wide area network (WAN), or the like. Also, the network 120 may be configured to perform communication with a communication protocol conforming to the Open Network Video Interface Forum (ONVIF) standard, for example. Note that there is no limitation to this configuration, and the network 120 may also be configured to perform communication with another communication protocol such as the original communication protocol, for example.

Apparatus Configuration

Configuration of Image Capturing Apparatus

Figure 2:
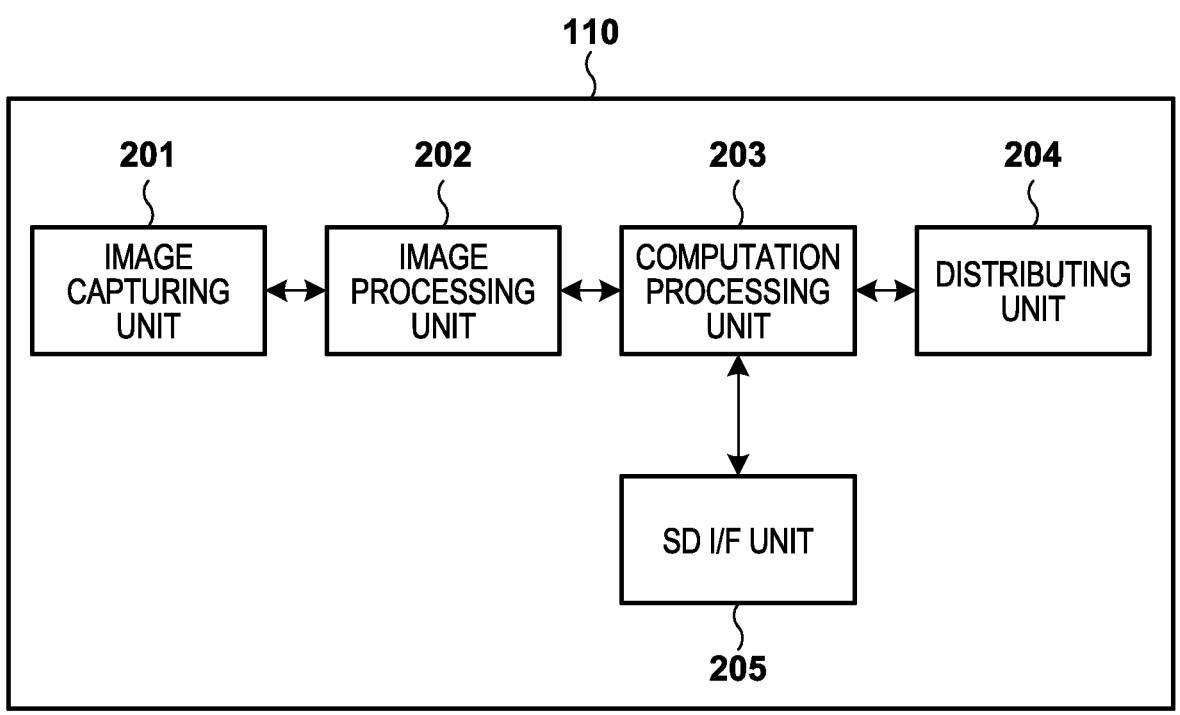
FIG. 2 is a diagram illustrating an example of a hardware configuration of an image capturing apparatus corresponding to the embodiments.

Next, an exemplary configuration of the image capturing apparatus 110 will be described with reference to FIG. 2. FIG. 2 is a diagram illustrating an exemplary hardware configuration of the image capturing apparatus 110. The image capturing apparatus 110 includes an image capturing unit 201, an image processing unit 202, a computation processing unit 203, a distributing unit 204, an SD I/F unit 205, as its hardware configuration, for example. I/F is an abbreviation of interface.

The image capturing unit 201 includes a lens unit for forming an image by light and an image sensor for performing analog signal conversion in accordance with light with which an image is formed. The lens unit has a zoom function for adjusting the angle of view, a diaphragm function for adjusting the light amount, and the like. The image sensor has a gain function for performing sensitivity adjustment when light is converted to an analog signal. These functions are adjusted based on setting values notified from the image processing unit 202. The analog signal generated by the image capturing unit 201 is converted to a digital signal by an analog to digital conversion circuit, and the digital signal is transferred to the image processing unit 202 as an image signal.

The image processing unit 202 includes an image processing engine, peripheral devices thereof, and the like. The peripheral device includes random access memory (RAM), I/F drivers, and the like, for example. The image processing unit 202 generates image data by performing image processing such as developing processing, filtering processing, sensor correction, noise removal, and the like on the image signal acquired from the image capturing unit 201, for example. Also, the image processing unit 202 transmits setting values to the lens unit and the image sensor, and may execute exposure adjustment such that an appropriate exposure image can be acquired. The image data generated by the image processing unit 202 is transferred to the computation processing unit 203.

The computation processing unit 203 includes one or more processors such as CPU and MPU, memories such as RAM and ROM, I/F drivers, and the like. Note that CPU is an acronym of Central Processing Unit, MPU is an acronym of Micro Processing Unit, and ROM is an acronym of Read Only Memory. The computation processing unit 203 executes various types of processing such as control and computation that are needed for the operations of the image capturing apparatus 110. Also, in one example, assignment of portions of processing to be executed in the system described above to the image capturing apparatus 110 and the detachable device 100 for execution is determined, and the image capturing apparatus 110 and the detachable device 100 may execute the processing according to the determined assignment. The details of the processing contents and the assignment of processing will be described below. An image received from the image processing unit 202 is transferred to the distributing unit 204 or the SD I/F unit 205. Also, the processing result data is also transferred to the distributing unit 204.

The distributing unit 204 includes a network distribution engine and peripheral devices such as RAM and an ETH PHY module, for example. The ETH PHY module is a module for executing processing of the Ethernet physical (PHY) layer. The distributing unit 204 coverts the image data and processing result acquired from the computation processing unit 203 to a format for enabling distribution to the network 120, and outputs the converted data to the network 120.

The SD I/F unit 205 is an interface portion for connection with the detachable device 100, and includes a mounting part such as a socket for attachment/detachment of a power supply and the detachable device 100, for example. Here, it is assumed that the SD I/F unit 205 is configured following the SD standard defined by the SD Association. The communication between the detachable device 100 and the image capturing apparatus 110 such as transferring an image acquired from the computation processing unit 203 to the detachable device 100 and acquiring data from the detachable device 100 is performed through the SD I/F unit 205.

Figure 3:
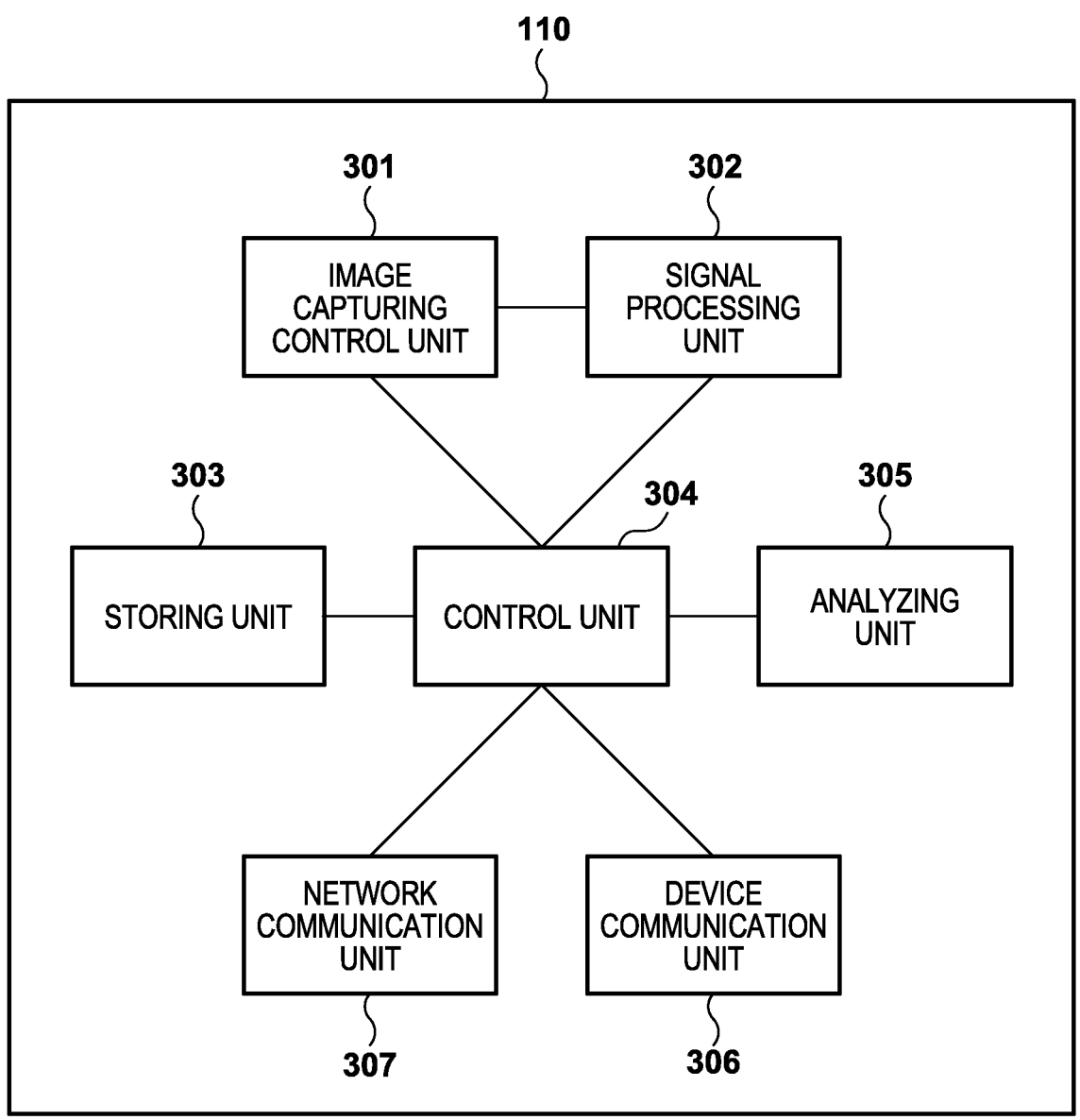
FIG. 3 is a diagram illustrating an example of a functional configuration of the image capturing apparatus corresponding to the embodiments.

Next, an exemplary functional configuration of the image capturing apparatus 110 will be described with reference to FIG. 3. The image capturing apparatus 110 includes an image capturing control unit 301, a signal processing unit 302, a storing unit 303, a control unit 304, an analyzing unit 305, a device communication unit 306, and a network communication unit 307, as its functional units.

The image capturing control unit 301 corresponds to the one or more processors such as CPU and MPU in the computation processing unit 203, and executes control to capture images of the surrounding environment via the image capturing unit 201. The signal processing unit 302 corresponds to the image processing unit 202, and generates captured image data by performing predetermined processing on an image captured by the image capturing control unit 301. In the following, the captured image data is simply referred to as a "captured image". The signal processing unit 302 encodes the image captured by the image capturing control unit 301, for example. The signal processing unit 302 encodes still images using an encoding system such as the Joint Photographic Experts Group (JPEG), for example. Also, the signal processing unit 302 encodes moving images using an encoding system such as H.264/MPEG-4 AVC (referred to as "H.264" below) or high efficiency video coding (HEVC). Also, the signal processing unit 302 may encode images using an encoding system selected by a user from a plurality of preset encoding systems, via an operation unit (unshown) of the image capturing apparatus 110, for example.

The storing unit 303 corresponds to various storage apparatuses included in the image processing unit 202 and the computation processing unit 203, and stores a list of analysis processing that can be executed in the analyzing unit 305 and a list of postprocessing for analysis processing results. Note that, in the present embodiment, the image processing to be executed is analysis processing, but any processing may also be executed, and the storing unit 303 stores an analysis processing list and a postprocessing list regarding processing related to the processing to be executed.

The control unit 304 corresponds to one or more processors such as CPU and MPU in the computation processing unit 203, and controls the signal processing unit 302, the storing unit 303, the analyzing unit 305, the device communication unit 306, and the network communication unit 307 such that each of them executes predetermined processing.

The analyzing unit 305 corresponds to one or more processors such as CPU and MPU in the computation processing unit 203, and selects image processing to be executed on a captured image from at least any of preprocessing for analysis, analysis processing, and postprocessing for analysis, which will be described later, and executes the selected image processing. The preprocessing for analysis is image processing to be executed on a captured image before executing the later-described analysis processing. It is assumed that, in the preprocessing for analysis of the present embodiment, processing for creating divided images by dividing a captured image is to be executed, as an example. The analysis processing is image processing for analyzing an input image and outputting information obtained by the analysis.

It is assumed that, in the analysis processing of the present embodiment, processing is executed in which at least any of human body detection processing, face detection processing, and vehicle detection processing is executed using the divided images obtained by the preprocessing for analysis as an input, and the analysis processing result is output, as an example. The analysis processing may be image processing configured to output the position of an object included in divided images using a machine learning model subjected to learning so as to be able to detect an object included in an image using a technique described in "J. Redmon, A. Farhadi "YOLO9000: Better Faster Stronger", Computer Vision and Pattern Recognition (CVPR) 2016", for example.

That is, the image processing includes analysis processing using a trained neural network that can perform feature extraction for detecting a predetermined object. The postprocessing for analysis is image processing that is executed after the analysis processing has been executed. It is assumed that, in the postprocessing for analysis of the present embodiment, image processing is executed in which a value obtained by adding up the number of objects detected in divided images is output as the processing result, based on the results of analysis processing performed on the divided images, for example. Note that the analysis processing may also be processing in which an object in an image is detected by performing pattern matching, and the position of the object is output.

The device communication unit 306 corresponds to the SD I/F unit 205, performs communication with the detachable device 100, and supplies a clock signal for generating a later-described clock signal for processing to the detachable device 100. The device communication unit 306 converts the format of input data to a format that the detachable device 100 can process, and transmits the data obtained by the conversion to the detachable device 100. Also, the device communication unit 306 receives data from the detachable device 100, and converts the format of the received data to a format that the image capturing apparatus 110 can process. In the present embodiment, it is assumed that the device communication unit 306 executes processing for converting decimals between a floating point format and a fixed point format, but there is no limitation to this type of processing, and another processing may also be executed by the device communication unit 306. Also, in the present embodiment, it is assumed that the device communication unit 306 performs communication with the detachable device 100 by transmitting a request (or, command, command sequence) determined in advance in the range of the SD standard to the detachable device 100, and receiving a response from the detachable device 100. The network communication unit 307 corresponds to the distributing unit 204, and performs communication with the input/output apparatus 130 via the network 120.

Configuration of Detachable Device

Figure 4:
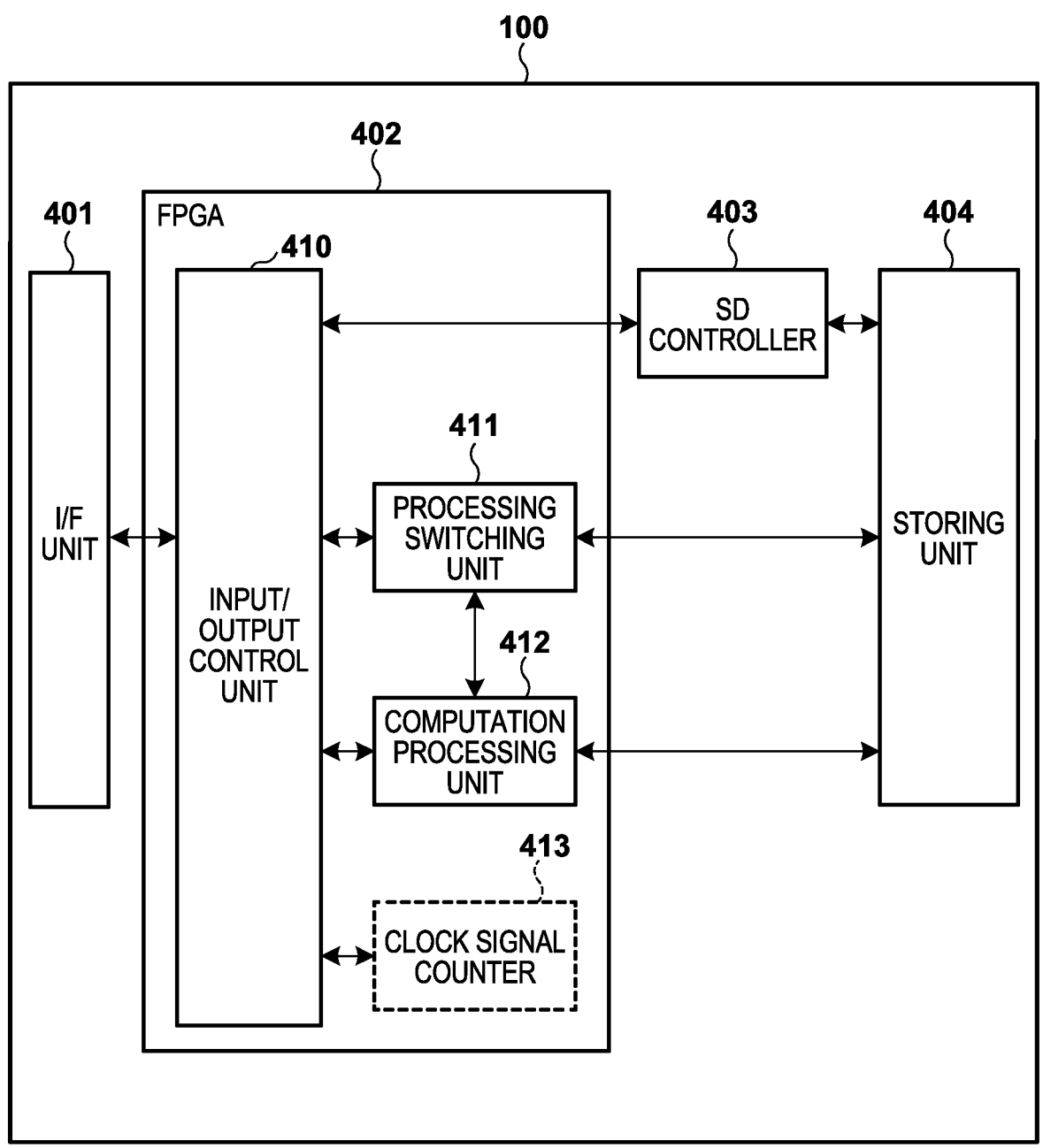
FIG. 4 is a diagram illustrating an example of a hardware configuration of a detachable device corresponding to the embodiments.

Next, an exemplary hardware configuration of the detachable device 100 will be described with reference to FIG. 4. The detachable device 100 includes an I/F unit 401, an FPGA 402, an SD controller 403, and a storing unit 404, for example. It is assumed that the detachable device 100 is formed with a shape for enabling insertion and removal to and from the socket of the SD I/F unit 205 included in the image capturing apparatus 110, that is, formed with a shape conforming to the SD standard.

The I/F unit 401 is an interface portion for connecting the detachable device 100 to an apparatus such as the image capturing apparatus 110. The I/F unit 401 includes electrical contact terminals and the like, receives supply of power from the image capturing apparatus 110, and generates and distributes power supplies to be used in the detachable device 100, for example. It is assumed that, similarly to the SD I/F unit 205 of the image capturing apparatus 110, regarding items defined in the SD standard, the I/F unit 401 follows (in conformity to) the definitions. Reception of images and setting data from the image capturing apparatus 110 and transmission of data from the FPGA 402 to the image capturing apparatus 110 are executed via the I/F unit 401.

The FPGA 402 includes an input/output control unit 410, a processing switching unit 411, and a computation processing unit 412. The FPGA 402 is one type of semiconductor device whose internal logic circuit structure can be repeatedly reconfigured. A processing function can be added (provided) to an apparatus on which the detachable device 100 is mounted by processing realized by the FPGA 402. Also, with the reconfiguring function of the FPGA 402, the logic circuit structure can be changed later, and therefore, by attaching the detachable device 100 to an apparatus in a field in which technical advancement is rapid, the apparatus can execute appropriate processing at an appropriate time, for example.

In the present embodiment, an example in which an FPGA is used is described, but a general-purpose ASIC or a dedicated LSI may also be used, as long as later-describing processing can be realized, for example. The FPGA 402 is started by writing into setting data including information regarding the logic circuit structure to be generated from a dedicated I/F, or by reading out the setting data from the dedicated I/F. In the present embodiment, it is assumed that the setting data is retained in the storing unit 404. Upon turning on a power supply, the FPGA 402 reads out the setting data from the storing unit 404, generate a logic circuit, and then starts. Note that there is no limitation to this configuration, and a configuration may also be adopted in which, by implementing a dedicated circuit in the detachable device, the image capturing apparatus 110 writes setting data into the FPGA 402 via the I/F unit 401, for example.

The input/output control unit 410 includes a circuit for transmitting and receiving images to and from the image capturing apparatus 110, a circuit for analyzing a command received from the image capturing apparatus 110, a circuit for performing control based on the analyzed result, and the like. The commands here are defined in the SD standard, and the input/output control unit 410 can detect some of the defined commands. The details of the functions will be described later. The input/output control unit 410 performs control such that, in the case of storing processing, an image is transmitted to the SD controller 403, and in the case of image analysis processing, an image is transmitted to the computation processing unit 412. Also, the input/output control unit 410, upon receiving setting data for switching processing, transmits the setting data to the processing switching unit 411.

The processing switching unit 411 includes circuits for acquiring information regarding an image processing function from the storing unit 404 based on setting data received from the image capturing apparatus 110, and for writing the information into the computation processing unit 412. The information regarding the image processing function is a setting parameter indicating the sequence and type of computation to be processed in the computation processing unit 412 and computation coefficients, for example. The computation processing unit 412 includes a plurality of computation circuits that are needed to execute the image processing function such as image analysis. The computation processing unit 412 executes computation processing based on information regarding the image processing function received from the processing switching unit 411, and transmits the processing result to the image capturing apparatus 110, and/or stores the processing result in the storing unit 404.

The FPGA 402 extracts setting data of a processing function to be executed that is included in setting data corresponding to a plurality of processing functions that are retained in advance, and rewrites processing contents to be executed by the computation processing unit 412 based on the extracted setting data. Accordingly, the detachable device 100 can selectively execute at least one of the plurality of processing functions. Also, as a result of adding setting data for processing that is newly added as appropriate, latest processing can be executed in the image capturing apparatus 110. Note that, in the following, the fact that a plurality of pieces of setting data respectively corresponding to the plurality of processing functions are included is expressed as including the plurality of processing functions. That is, even in a state in which the FPGA 402 of the detachable device 100 is configured to execute one processing function, if the processing contents of the computation processing unit 412 can be changed with setting data for another processing function, this fact is expressed as including a plurality of processing functions. The clock signal counter 413 will be described in detail in a second embodiment.

The SD controller 403 is a known control integrated circuit (IC) such as one defined in the SD standard, and executes control of a slave operation according to the SD protocol, and data read/write control for storing unit 404. The storing unit 404 is constituted by a NAND-type flash memory, for example, and stores various types of information such as storage data written into by the image capturing apparatus 110, information regarding an image analysis processing function to be written into the computation processing unit 412, setting data of the FPGA 402, and circuit data for analysis.

Figure 5:
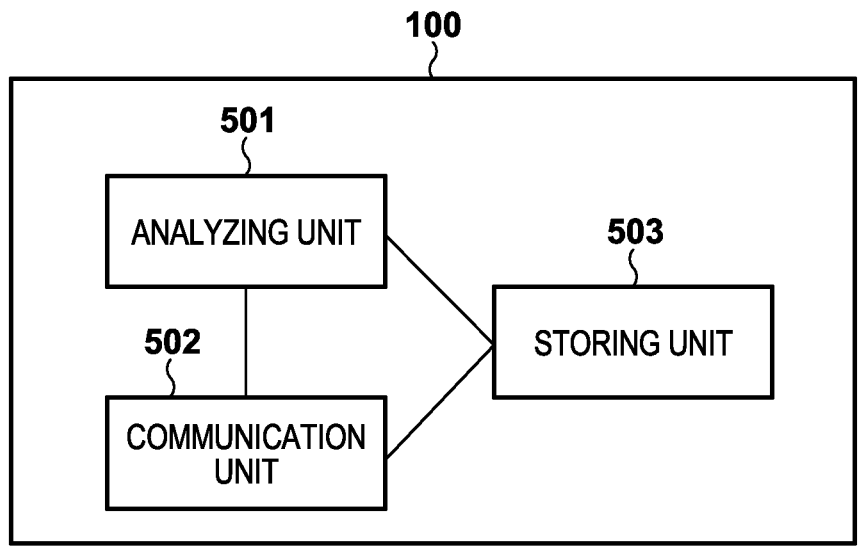
FIG. 5 is a diagram illustrating an example of a functional configuration of the detachable device corresponding to the embodiments.

Next, an exemplary functional configuration of the detachable device 100 will be described with reference to FIG. 5. The detachable device 100 includes an analyzing unit 501, a communication unit 502, and a storing unit 503, as its functional configuration, for example. The analyzing unit 501 executes various types of image processing (computation processing) including analysis processing on an image. The analyzing unit 501 corresponds to the FPGA 402, and upon receiving input of a setting request of analysis processing from the image capturing apparatus 110, configures setting for entering a state in which the analysis processing is executable, for example. The setting request of analysis processing can include information for designating the type of analysis processing to be made executable, and the analyzing unit 501 configures setting for making the type of analysis processing designated by the setting request executable. Also, the analyzing unit 501, upon receiving input of an image, executes the analysis processing that is set to be executable on the input image. The communication unit 502 corresponds to the I/F unit 401, and performs communication with the image capturing apparatus 110. The storing unit 503 corresponds to the SD controller 403 and the storing unit 404, stores image data received from the image capturing apparatus 110, and is also used as a work area for image processing in the analyzing unit 501. In the present embodiment, the configuration is such that the result of analysis processing in the analyzing unit 501 is stored as appropriate in the storing unit 503, even in a middle of processing.

In the present embodiment, the types of executable analysis processing include human body detection processing and face detection processing, but the example of executable analysis processing is not limited thereto. For example, the executable analysis processing may also be processing for determining whether or not an input image includes a subject (person, vehicle, object, or the like) stored in the storing unit 503 in advance, for example. Specifically, a matching degree between an image feature amount of a person stored in advance and an image feature amount of a person detected from the input image is calculated, and if the matching degree is a threshold value or more, it can be determined that the person stored in advance is present. Also, for the purpose of privacy protection, the executable analysis processing may also be processing of superimposing a predetermined mask image or performing mosaic processing on a person, an object, a region, or the like that has been detected from the input image. Also, the executable analysis processing may also be processing for detecting whether or not a person in an image is performing a specific action, using a learning model that has been subjected to learning regarding the specific action of a person by machine learning. Furthermore, the executable analysis processing may also be processing for determining what type of region is the region in an image. For example, the executable analysis processing may also be processing for determining what type of region is the region in an image using a learning model that has been subjected to learning regarding a building, a road, person, the sky, and the like by machine learning.

As described above, the executable analysis processing can be applied to image analysis processing using machine learning, and also to image analysis processing in which machine learning is not used. Also, the analysis processing described above may also be executed in cooperation with the image capturing apparatus 110, instead of being performed by the detachable device 100 independently.

Description of Processing Sequence for not Causing Clock Signal Supply to Stop

In the present embodiment, the computation processing unit 412 in the detachable device 100 can execute processing with clock signals supplied from the image capturing apparatus 110, and when the clock signal supply is stopped, enters a state in which the processing will not end. Therefore, the image capturing apparatus 110 needs to continue the clock signal supply while the detachable device 100 is executing processing. However, when an attempt is made to control the detachable device 100 only by software added to the image capturing apparatus 110, existing firmware that controls the I/F unit 401 of the image capturing apparatus 110 cannot ascertain whether the detachable device is performing image processing. Therefore, when communication is not performed through the I/F unit 401, there is a possibility that, depending on the image capturing apparatus 110, the state will transition to a power saving mode or the like, and the supply of clock signals used for analysis processing will be stopped.

Therefore, in the present embodiment, the image capturing apparatus 110 operates so as to maintain the clock signal supply after instructing to execute analysis processing such that the image processing in the detachable device 100 will not stop. The details of the processing corresponding to the present embodiment will be described below. First, with reference to FIG. 6, an example of processing will be described that is to be executed between the image capturing apparatus 110 and the detachable device 100 for not causing the clock signal supply needed for image processing to stop. The processing corresponding to the flowchart can be realized, in the image capturing apparatus 110, by one or more processors (CPU, MPU, and the like) that function as the control unit 304 executing a corresponding program (stored in a memory that functions as the storing unit 303), for example. Also, in the detachable device 100, the processing corresponding to the flowchart can be realized by the FPGA 402 that is started after reading out corresponding setting data from the storing unit 404 and generating the logic circuit.

First, in step S601, the control unit 304 of the image capturing apparatus 110 transmits a captured image on which analysis processing is to be performed to the detachable device 100 via the device communication unit 306. In step S611, the communication unit 502 of the detachable device 100 receives the image. In step S602 next, the control unit 304 of the image capturing apparatus 110 issues an execution instruction command for commanding execution instruction of processing via the device communication unit 306 such that image processing such as analysis processing is started on the captured image. Upon receiving the execution instruction command, in step S612, the analyzing unit 501 of the detachable device 100 starts the analysis processing. In step S603 next, the control unit 304 of the image capturing apparatus 110 issues a command for clock signal supply (hereinafter, dummy command or first command) via the device communication unit 306. The communication unit 502 of the detachable device 100 receives the dummy command in step S613.

In the SD I/F, clock signals continue to be supplied while communication is performed according to the protocol, and therefore the image capturing apparatus 110 continues to supply clock signals to the detachable device 100, as a result of continuously issuing the dummy command. The detachable device 100 performs analysis processing using clock signals that are supplied when commands and data are communicated. A configuration may also be adopted in which information regarding the clock signals needed until the detachable device 100 ends analysis is retained in the storing unit 403 of the detachable device 100 as described above, and the image capturing apparatus 110 reads out the information before starting the analysis. As a result of ascertaining the number of clock signals needed until the end of the analysis, the image capturing apparatus 110 can determine the period during which the dummy commands are to be issued, and the timing of requesting the processing result (analysis result). The analyzing unit 501 of the detachable device 100 counts the number of clock signals received from the image capturing apparatus 110, and in step S614, the analyzing unit 501 of the detachable device 100 ends the analysis processing at a point in time at which clock signals of a number needed for the analysis processing have been received from the image capturing apparatus 110. Accordingly, a state is achieved in which the analyzing unit 501 can output a normal analysis result. In the image capturing apparatus 110, after issuing dummy commands such that the clock signals of at least a number needed for the analysis processing are output, in step S604, the control unit 304 issues an output request command for requesting a processing result of the analysis processing via the device communication unit 306, and the detachable device 100, upon receiving the output request command in step S615, transmits a processing result to the image capturing apparatus 110 in step S616. In step S605, the image capturing apparatus 110 receives the processing result.

As a result of performing the sequence processing above, even in a case where a detachable device is attached to an apparatus that stops the clock signal supply when communication does not occur, as a result of the image capturing apparatus 110 issuing dummy commands in a period in which the detachable device 100 continues to perform analysis processing, the clock signal supply can be continued, and therefore clock signals continue to be supplied to the analyzing unit 501, and the analysis processing can be normally ended.

Dummy Command

The dummy command in the present embodiment may be, when the SD I/F is used, a data read command, or may also be a command for requesting a status response without exchanging data. In the SD I/F, when data communication is performed, a command is communicated in a command line, and data is communicated in a data line. Here, data to be communicated may be dummy data. On the other hand, in the case of communication in which only a status response is requested and data is not communicated, a command is similarly communicated in the command line, but the data line is not used because there is no data exchange. When a read command is used, the number of blocks may be set, in advance, such that the number of clock signals needed to output data of a number of data blocks to be read is similar to the number of clock signals (processing time) needed for the analysis processing. For example, a case where 100,000 clock signals are needed for the analysis processing is considered to be as follows. 512 byte-data is read per one block, and therefore when data is read in a setting in which the data line consists of 4 bits, 1024 clock signals are supplied per one block. As a result, if the number of blocks is set to be about 100, the analysis processing that needs 100,000 clock signals is ended. Note that, in actuality, because command communication is performed for each block, it is preferable that the number of clock signals needed for this communication is added.

Figure 6:
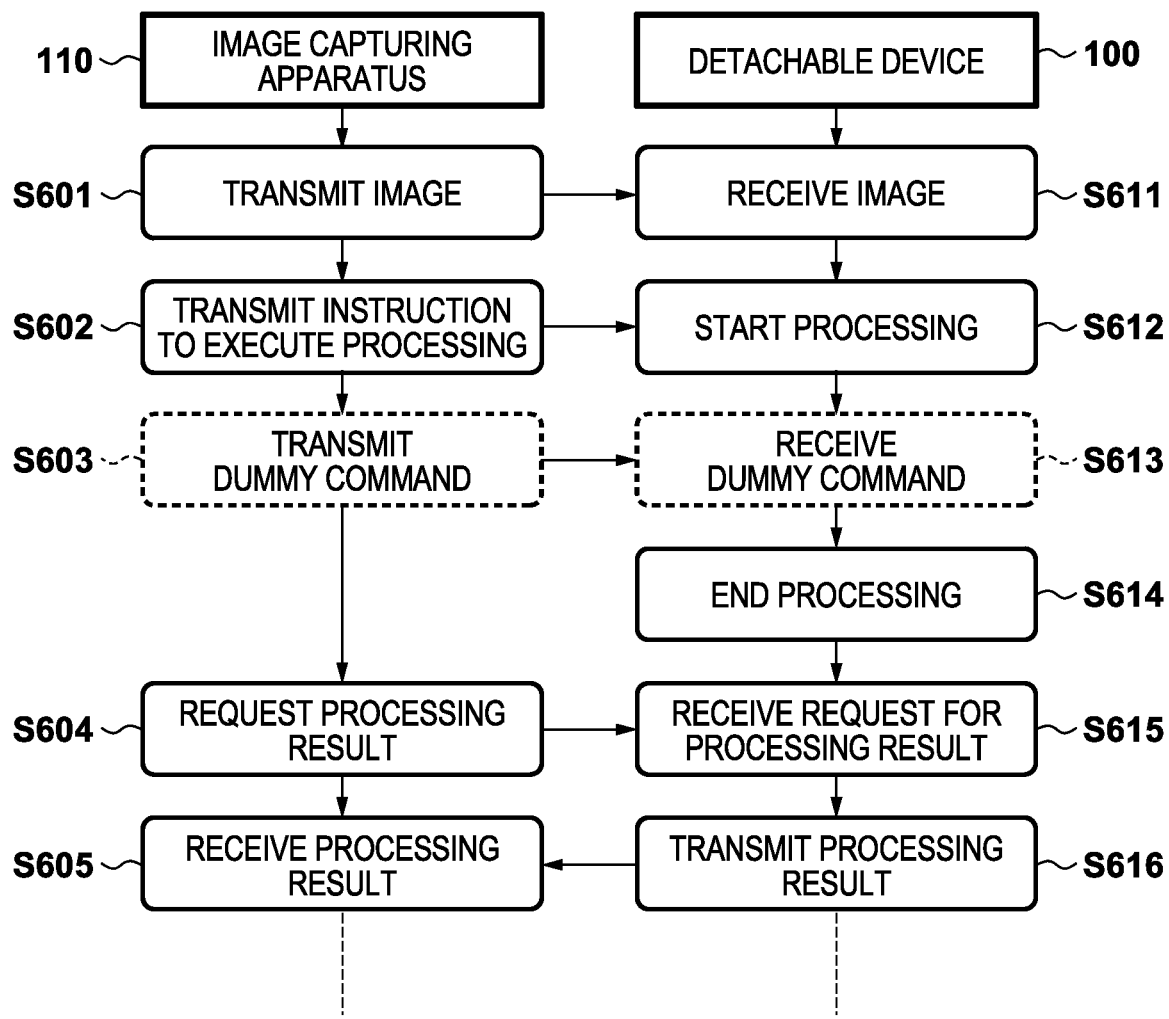
FIG. 6 is a flowchart illustrating an example of processing corresponding to the embodiments.

In the processing in FIG. 6 described above, when a read command is used, the detachable device 100 may return data in which unique data or an identifier indicating that the analysis is ended is embedded in a read data block, at the timing of step S614 at which the analysis processing is ended. Also, when a command for requesting a status response is used, data exchange does not occur, and therefore predetermined data or an identifier indicating that the analysis is ended may also be embedded in an argument of the response. Accordingly, the image capturing apparatus 110 can determine that the processing in the detachable device 100 is ended by discriminating the unique data in a read data block or the predetermined identifier in an argument of the response, and the processing can be advanced to step S604. As described above, the image capturing apparatus 110 can immediately stop issuing a dummy command by detecting data indicating the end of analysis that is embedded in read data or a response, and therefore redundant clock signal supply is prevented, and the time from the analysis start until an analysis result is acquired can be reduced.

An example has been described in which dummy commands are continued to be issued when the SD I/F is used, but when an I/F different from the SD I/F is used, the operation is not limited to this type, and the operation need only be an operation for causing clock signal supply to be continued.

According to the present embodiment, even in a case where a detachable device 100 is attached to an image capturing apparatus 110 that stops clock signal supply when communication is not performed, the image capturing apparatus 110 can continue the clock signal supply by issuing dummy commands while the detachable device 100 continues analysis processing. Accordingly, the image capturing apparatus 110 can allow the detachable device 100 to normally end processing, and acquire a processing result.

Second Embodiment

In the embodiment described above, a case has been described in which clock signal supply is continued by indiscriminately transmitting dummy commands after starting analysis processing, but in the present embodiment, a case will be described in which whether clock signal supply is performed is determined, and if it is determined that clock signal supply is not performed, dummy commands are transmitted. In the present embodiment, whether or not clock signal supply is performed is determined using a clock counter, or is determined based on an analysis result. These cases will be described specifically described below.

Figure 7:
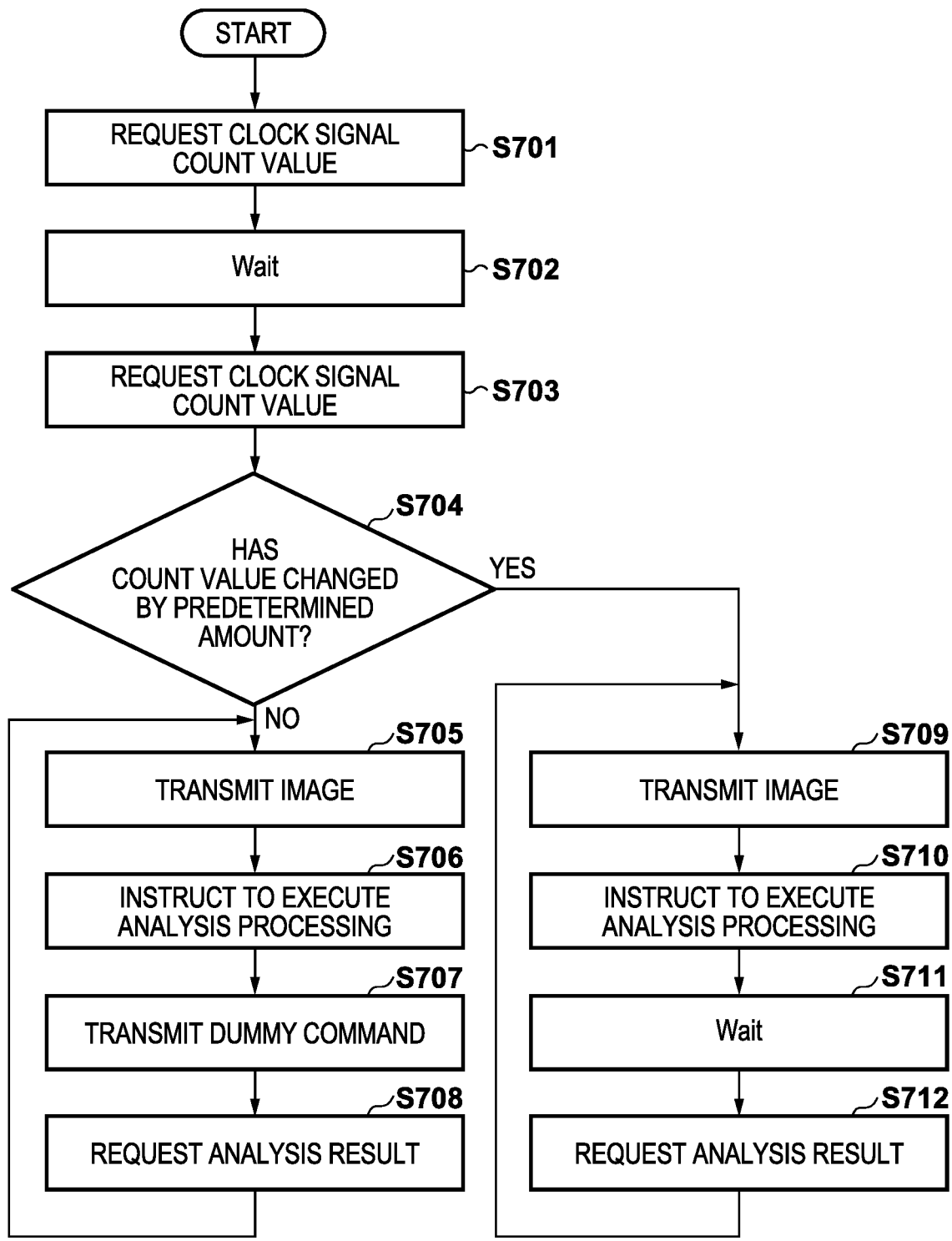
FIG. 7 is a flowchart illustrating an example of processing for determining whether or not the clock signal is supplied, which corresponds to a second embodiment.

Determining Whether or not Clock Signal Supply is Performed Using a Clock Counter A processing flow for determining whether or not an image capturing apparatus 110 stops clock signal supply to a detachable device 100 will be described with reference to FIG. 7. The processing corresponding to the flowchart can be realized, in the image capturing apparatus 110, by one or more processors (CPU, MPU, and the like) that function as a control unit 304 executing a corresponding program (stored in a memory that functions as a storing unit 303), for example. Also, although not described in FIG. 7, in the detachable device 100, the processing corresponding to the flowchart can be realized by an FPGA 402 that is started after reading out corresponding setting data from a storing unit 404 and generating the logic circuit.

In the following, a method in which a clock counter 413 is included in the detachable device 100 will be described, as an example of determination processing for determining whether or not clock signal supply is performed. Specifically, as shown in FIG. 4, the clock signal counter 413 for performing counting when a clock signal is supplied from the image capturing apparatus 110 is arranged in the FPGA 402 in the detachable device 100.

Also, an analyzing unit 501 has a clock signal counter function corresponding to the counter circuit, counts the number of received clock signals, and outputs a count value of clock signals in response to a command for requesting the clock signal count value from the image capturing apparatus 110. A storing unit 503 stores information such as the number of clock signals needed in a period from start to end of image processing such as analysis processing. The number of clock signals needed for the analysis processing indicates the number of clock signals to be supplied from the image capturing apparatus 110 in order for a computation processing unit 412 to end processing.

First, in step S701, the control unit 304 of the image capturing apparatus 110 issues a command for requesting the clock signal count value to the detachable device 100 via a device communication unit 306, and reads out the value of the clock signal counter 413. In the detachable device 100, upon receiving the command for requesting the clock signal count value, the input/output control unit 410 reads out a current counter value of the clock signal counter 413, and outputs the count value to the image capturing apparatus 110 via an I/F unit 401.

In step S702 next, the control unit 304 performs waiting (stand-by state) for a predetermined time without issuing commands such that communication is not performed between the image capturing apparatus 110 and the detachable device 100. In step S703 next, the control unit 304 again issues a command for requesting the clock signal count value, and reads out the value of the clock signal counter 413 from the detachable device 100. With this operation, the count value can be read out at timings that are separate by the predetermined time. In the detachable device 100, upon receiving the command for requesting the clock signal count value, the input/output control unit 410 again reads out a current counter value of the clock signal counter 413, and outputs the count value to the image capturing apparatus 110 via the I/F unit 401.

In step S704 next, the control unit 304 compares the clock signal count values that are read out at timings that are separate by the predetermined time in steps S701 and S703, and determines whether the number of clock signal changes by a predetermined amount (increase) in an amount corresponding to the fixed waiting time in step S702. For example, in a case where a high-speed mode (50 MHz clock) of the SD standard is used, when a waiting of 100 µs is inserted, if the count value has increased by about 5,000, it can be determined that the count value has changed by the predetermined amount, and the clock signal supply from the image capturing apparatus 110 to the detachable device 100 is continued. On the other hand, if the value has increased by about 100, the change is incurred by exchanging of clock signal count request commands, and it cannot be said that the count value has changed by the predetermined amount. Therefore, in this case, it can be determined that the clock signal supply stops. In the former case, it is estimated that the image capturing apparatus 110 continues the clock signal supply even if dummy commands are not supplied, but in the latter case, it is estimated that dummy commands need to be output in order to continue the clock signal supply from the image capturing apparatus 110.

Therefore, in the determination in step S704, if it is determined that the count value has changed by the predetermined amount ("NO" in step S704), the processing is advanced to step S705, and if it is determined that the count value has not changed by the predetermined amount ("YES" in step S704), the processing is advanced to step S709. First, in step S705, the control unit 304 of the image capturing apparatus 110 transmits a captured image to be analyzed to the detachable device 100, and issues a command for instructing execution of analysis processing on the captured image in step S706. In step S707 next, the control unit 304 issues dummy commands, which are for enabling clock signal supply needed for the analysis processing, in an amount corresponding to the number of clock signals needed for the analysis processing. Thereafter, in step S708, the control unit 304 issues a command for requesting an analysis result, and acquires the analysis result. Then, by repeating the processing in steps S705 to S708, the analysis processing can be executed by performing clock signal supply to the detachable device 100 using dummy commands, even in a case where the clock signal supply is stopped.

On the other hand, in step S709, the control unit 304 of the image capturing apparatus 110 transmits a captured image to be analyzed to the detachable device 100, and issues a command for instructing execution of analysis processing in step S710. Thereafter, in step S711, the control unit 304 waits for a period of time needed for the analysis, then issues a command for requesting an analysis result in step S712, and acquires the analysis result. Then, by repeating the processing in steps S709 to S712, the analysis processing can be executed in the detachable device 100 using clock signal supply from the image capturing apparatus 110 when the clock signal supply is not stopped.

The response from the detachable device 100 in response to the command for requesting the count value transmitted in step S701 or S703 may be a response by a command that does not incur data communication, or may also be a response by data such as a read command. In the description above, requesting is made before starting analysis processing, for the sake of description, but requesting may be made regularly. Also, regarding the timing at which the count value is requested, the request is made in a period in which analysis processing is not executed, in particular, in a period in which communication regarding the analysis processing is not performed such as a period before the analysis is started, and as a result, issuance of a command for analysis processing can be prevented from being interrupted.

Figure 8:
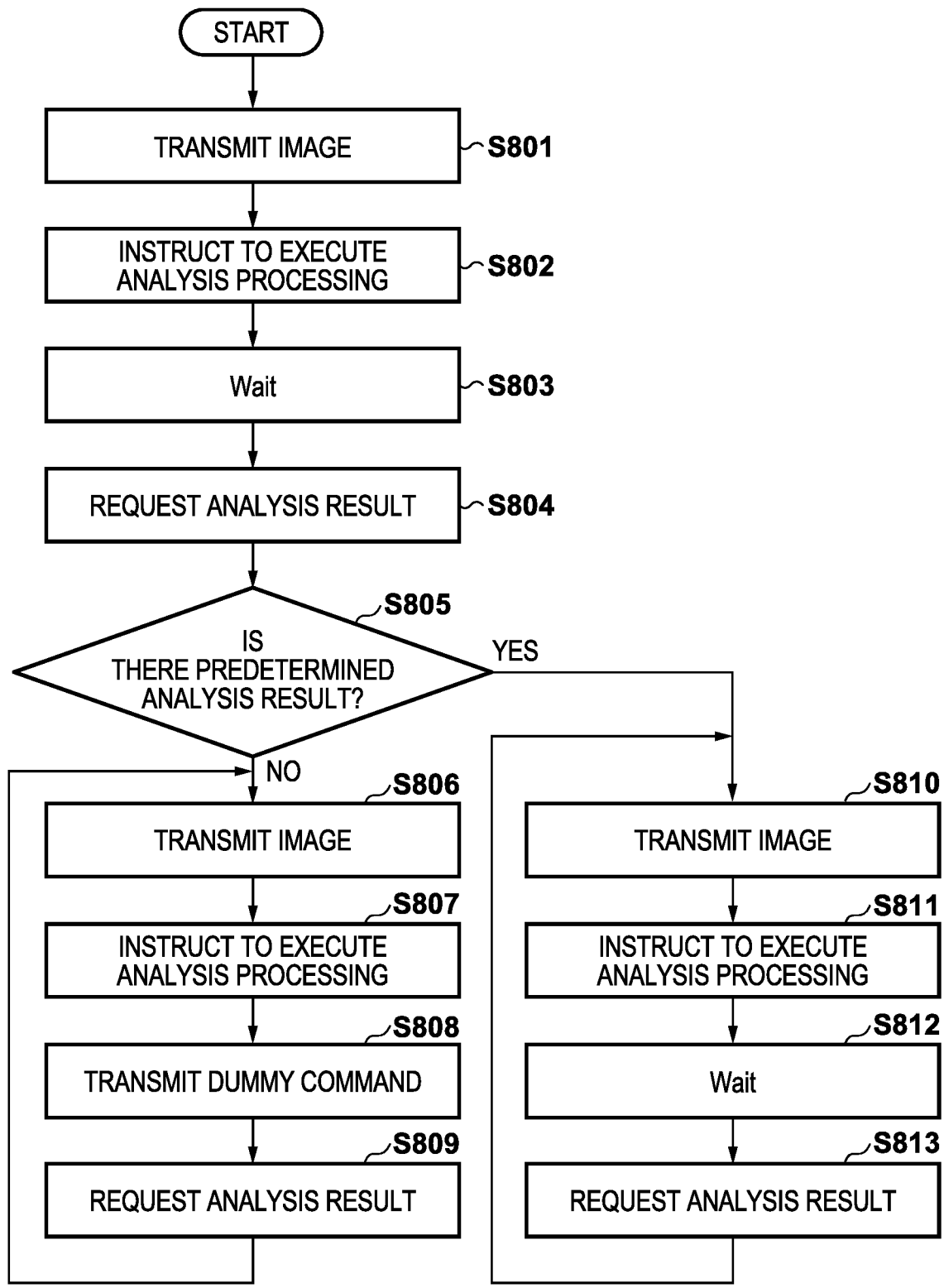
FIG. 8 is a flowchart illustrating another example of processing for determining whether or not the clock signal is supplied, which corresponds to the second embodiment.

Determining Whether or not Clock Signal Supply is Performed Based on Analysis Result Next, a flow of processing for determining whether or not the clock signal is supplied from the image capturing apparatus 110 to the detachable device using an analysis result will be described with reference to FIG. 8. In FIG. 7 described above, whether or not the clock signal is supplied is determined using a clock signal counter, but in FIG. 8, whether or not the clock signal is supplied is determined using an actual result of analysis performed on a captured image. The processing corresponding to the flowchart can be realized, in the image capturing apparatus 110, by one or more processors (CPU, MPU, and the like) that function as the control unit 304 executing a corresponding program (stored in a memory that functions as the storing unit 303), for example. Also, although not described in FIG. 8, in the detachable device 100, the processing corresponding to the flowchart can be realized by the FPGA 402 that is started after reading out corresponding setting data from the storing unit 404 and generating the logic circuit.

First, in step S801, the control unit 304 of the image capturing apparatus 110 transmits a captured image to be analyzed to the detachable device 100. In step S802 next, the control unit 304 issues a command for instructing execution of analysis processing on the transmitted captured image. In the detachable device 100, upon receiving the command for instructing execution of analysis processing after receiving a captured image, the analyzing unit 501 starts the analysis processing on the captured image. The control unit 304 waits for a predetermined time needed for analysis or more in step S803 next, and in S804, acquires an analysis result by issuing a command for requesting the analysis result. Upon receiving the command for requesting the analysis result, the detachable device 100 outputs the result of analysis processing on the captured image performed by the analyzing unit 501 at the timing at which the command has been received (even in the middle of analysis) to the image capturing apparatus 110. In the present embodiment, a configuration is adopted in which the result of analysis processing in the analyzing unit 501 is successively stored in the storing unit 503 even in the middle of processing. Therefore, the analysis result stored in the storing unit 503 at the timing at which the command for requesting the analysis result has been received need only be output.

Here, the predetermined time may not be a time needed for completely ending the analysis processing on a captured image, and it is sufficient that the predetermined time is a time for enabling confirmation of a certain change in the analysis result. In step S805, the control unit 304 determines whether or not an analysis has been performed in the predetermined time. If the analysis processing has been performed after the analysis processing is started in response to the command for instructing execution in step S802, a predetermined analysis result is considered to be obtained after the predetermined time. For example, if the analysis is ended, an analysis result indicating that the analysis is ended is considered to be obtained, and if the analysis processing is undergoing, a processing result indicating that analysis processing is undergoing is considered to be obtained. However, if the clock signal supply is stopped, and the analysis processing has not been normally performed, such a predetermined analysis result cannot be obtained.

In step S805, if a predetermined analysis result has not been obtained ("NO" in step S805), the processing is advanced to step S806, and if a predetermined analysis result has been obtained ("YES" in step S805), the processing is advanced to step S810. First, in step S806, the control unit 304 of the image capturing apparatus 110 transmits a captured image to the detachable device 100, and issues a command for instructing execution of analysis processing in step S807. In step S808 next, the control unit 304 issues dummy commands, which are for enabling clock signal supply needed for the analysis processing, in an amount corresponding to the number of clock signals needed for the analysis processing. Thereafter, in step S809, the control unit 304 issues a command for requesting an analysis result, and acquires the analysis result. Then, by repeating the processing in steps S806 to S809, the analysis processing can be executed by performing clock signal supply to the detachable device 100 using dummy commands, even in a case where the clock signal supply is stopped.

On the other hand, in step S810, the control unit 304 of the image capturing apparatus 110 transmits a captured image to the detachable device 100, and issues a command for instructing execution of analysis processing in step S811. Thereafter, in step S812, the control unit 304 waits for a predetermined time needed for the analysis processing, then issues a command for requesting an analysis result in step S813, and acquires the analysis result. Then, by repeating the processing in steps S810 to S813, the analysis processing can be executed using clock signal supply from the image capturing apparatus 110 when the clock signal supply is not stopped.

In the processing described above, whether or not clock signal supply is performed is determined by performing requesting of analysis result only once, but the configuration may be such that a request of analysis result is made a plurality of times, and determination is made based on whether or not there is a change in analysis results received in response to the respective requests. Also, determination is made based on whether the analysis processing is ended. Furthermore, it may be determined that the clock signal supply is stopped, when a result of analysis performed on an image to be analyzed outputted is an initial value of the storing unit 404 that stores analysis results, or all 0xFF or all 0x00 that cannot be output as the result. Also, it can also be determined that the clock signal supply is stopped, when a result of analysis performed on a previous image to be analyzed that is stored in the storing unit 404 is output. It is because of the fact that, in the present embodiment, when the analysis processing is performed, analysis results are successively stored in the storing unit 404, and if the clock signal supply is performed, the result of analysis performed on the previous image to be analyzed cannot remain.

Also, the image to be transmitted in step S801 can be a predetermined image (referred to be a "test image") for which the analysis result is previously known, instead of a captured image in the image capturing apparatus 110. When the content of analysis processing performed on an image that is executed by the detachable device 100 is the same, the results of the analysis processing performed on the same image match. Therefore, when an analysis result that is as determined in advance is not returned, it can be estimated that the clock signal is stopped. In the present embodiment, images for which analysis results are known can be stored in the storing unit 303 of the image capturing apparatus 110 in advance as test images. Also, the analysis results obtained by analyzing test images in advance can also be retained in the storing unit 303.

As described above, in the present embodiment, the configuration is such that after determining whether clock signals are supplied from the image capturing apparatus 110 to the detachable device 100, analysis processing is performed on a captured image in a mode corresponding to the determination result. Accordingly, in a system in which clock signals are supplied even in a case where communication is not performed through the SD I/F, issuance processing of dummy commands can be omitted while processing is being performed, and therefore the processing load can be reduced.

The present invention is not limited to the above embodiments and various changes and modifications can be made within the spirit and scope of the present invention. Therefore, to apprise the public of the scope of the present invention, the following claims are made.

Other Embodiments

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-013587, filed on Jan. 31, 2022, which is hereby incorporated by reference herein in its entirety.

What is claimed is:

1. An image capturing apparatus including a mounting part for enabling attachment and detachment of a device, comprising:
   one or more processors; and
   one or more memories storing executable instructions which, when executed by the one or more processors, cause the image capturing apparatus to perform operations including:
   generating a first command for supplying clock signals for the device to execute analysis processing;
   transmitting, in a state where a device having a function of executing the analysis processing is attached to the mounting part, an image to the device;
   transmitting an execution instruction for executing the analysis processing on the image; and
   receiving a processing result obtained according to the execution instruction,
      wherein the first command is transmitted, after transmitting the execution instruction and at least in a period until the analysis processing performed on the image is ended in the device.

2. The image capturing apparatus according to claim 1, wherein the first command is generated in the generating such that clock signals of a number needed to end the analysis processing are provided from the image capturing apparatus to the device.

3. The image capturing apparatus according to claim 1, wherein the first command is a command for reading data from the device or a command for requesting a response regarding a status to the device.

4. The image capturing apparatus according to claim 1, wherein, upon receiving information indicating that the analysis processing in the device is ended from the device, in a response to the first command, issuance of the first command is stopped, and a request for a processing result of the analysis processing is transmitted.

5. The image capturing apparatus according to claim 1,
   wherein the one or more memories storing executable instructions which, when executed by the one or more processors, cause the image capturing apparatus to perform operations further including:
   receiving, from the device, count values obtained by counting a number of clock signals that the device has received from the image capturing apparatus at a predetermined time interval; and
      transmitting the first command when there is not a predetermined change between the received count values.

6. The image capturing apparatus according to claim 5, wherein when there is a predetermined change between the received count values, the first command is not transmitted after transmitting the execution instruction, and transmission of the processing result is requested.

7. The image capturing apparatus according to claim 5, wherein the count values is received at the predetermined time interval in a period in which the device is not executing the analysis processing.

8. The image capturing apparatus according to claim 5, wherein the case where there is the predetermined change includes a case where a change in number of clock signals that is larger than the number of clock signals corresponding to command communication for acquiring the count values occurs between the received count values.

9. The image capturing apparatus according to claim 1, one or more memories storing executable instructions which, when executed by the one or more processors, cause the image capturing apparatus to perform operations further including:

processing the processing result acquired from the device, wherein it is determined whether or not the first command is to be transmitted based on a result of processing performed on an image in the device.

10. The image capturing apparatus according to claim 9, wherein it is determined in the processing that the first command is to be transmitted when the processing result obtained after a predetermined time has elapsed after transmitting the execution instruction is not a predetermined processing result.

11. The image capturing apparatus according to claim 10, wherein the predetermined processing result is a processing result indicating that the analysis processing is completed, or a processing result indicating that the analysis processing is undergoing.

12. The image capturing apparatus according to claim 9, wherein it is determined in the processing that the first command is to be transmitted when the processing result obtained after a predetermined time has elapsed after transmitting the execution instruction includes a predetermined value.

13. The image capturing apparatus according to claim 9, wherein when the processing result is a processing result of a first image for which a result of the analysis processing is determined in advance,
it is determines in the processing that the first command is to be transmitted when the processing result does not match the result of the analysis processing that is determined in advance.

14. A device configured to be attachable and detachable to and from the image capturing apparatus according to claim 1, in a state where the device is attached to a mounting part of the image capturing apparatus, the device comprising:
one or more processors; and
one or more memories storing executable instructions which, when executed by the one or more processors, cause the device to perform operations including:
communicating with the image capturing apparatus;
performing analysis processing on an image received from the image capturing apparatus; and
transmitting, when a first command for clock signal supply for executing the analysis processing is received while the analysis processing is being executed, information indicating an end of the analysis processing in a response to the first command when the analysis processing is ended.

15. The device according to claim 14, one or more memories storing executable instructions which, when executed by the one or more processors, cause the device to perform operations further including:
counting the number of clock signals received from the image capturing apparatus; and
transmitting, in response to a request from the image capturing apparatus, a count value of the number of clock signals counted in the counting to the image capturing apparatus.

16. The device according to claim 14, wherein the device is a downsized device in a form such that the entirety of or more than half of the device is inserted into the image capturing apparatus.

17. A control method of an image capturing apparatus including a mounting part for enabling attachment and detachment of a device, in a state where a device having a function of executing analysis processing is attached to the mounting part, the method comprising:
transmitting an image to the device;
transmitting an execution instruction for executing the analysis processing on the image;
transmitting a first command for supplying clock signals for the device to execute analysis processing, after transmitting the execution instruction and at least in a period until the analysis processing performed on the image is ended in the device; and
receiving a processing result obtained according to the execution instruction.

18. A control method of a device configured to be attachable and detachable to and from the image capturing apparatus according to claim 1, in a state where the device is attached to a mounting part of the image capturing apparatus, the method comprising:
communicating with the image capturing apparatus;
performing analysis processing on an image received from the image capturing apparatus in the communicating;
receiving a first command for supplying clock signals for executing analysis processing while the analysis processing is being executed; and
transmitting information indicating an end of the analysis processing in a response to the first command when the analysis processing is ended.

19. A non-transitory computer-readable storage medium storing one or more programs including instructions that, when executed by a processor of an image capturing apparatus including a mounting part for enabling attachment and detachment of a device and in a state where a device having a function of executing analysis processing is attached to the mounting part, cause the image capturing apparatus to perform:
transmitting an image to the device;
transmitting an execution instruction for executing the analysis processing on the image;
transmitting a first command for supplying clock signals for the device to execute analysis processing, after transmitting the execution instruction and at least in a period until the analysis processing performed on the image is ended in the device; and
receiving a processing result obtained according to the execution instruction.

20. A non-transitory computer-readable storage medium storing one or more programs including instructions that, when executed by a processor of a device configured to be attachable and detachable to and from the image capturing apparatus according to claim 1, and in a state where the device is attached to the mounting part of the image capturing apparatus, cause the device to perform:
communicating with the image capturing apparatus;
performing analysis processing on an image received from the image capturing apparatus in the communicating;
receiving a first command for supplying clock signals for executing analysis processing while the analysis processing is being executed; and
transmitting information indicating an end of the analysis processing in a response to the first command when the analysis processing is ended.

* * * * *